US008191013B2

(12) United States Patent
Kiwada

(10) Patent No.: US 8,191,013 B2

(45) Date of Patent: May 29, 2012

(54) USER INTERFACE FOR DESIGNATING A PAGE AS A TAB SHEET AND INSERTING A TAB SHEET BETWEEN PAGES

(75) Inventor: Masakatsu Kiwada, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 389 days.

(21) Appl. No.: 12/406,239

(22) Filed: Mar. 18, 2009

(65) Prior Publication Data

US 2009/0311021 A1 Dec. 17, 2009

(30) Foreign Application Priority Data

Jun. 13, 2008 (JP) ................................. 2008-155978

(51) Int. Cl.
*G06F 3/048* (2006.01)

(52) U.S. Cl. ........................... 715/838; 715/769; 399/81

(58) Field of Classification Search ........................ None
See application file for complete search history.

(56) References Cited

U.S. PATENT DOCUMENTS 5,337,161 A 8/1994 Hube
7,258,497 B2 * 8/2007 Kujirai ............................ 400/61
2002/0131075 A1 * 9/2002 Kremer ........................ 358/1.15
2003/0026626 A1 * 2/2003 Sunada et al. .................. 399/82
2003/0151651 A1 8/2003 Roztocil
2004/0184103 A1 9/2004 Kremer et al.
2005/0041993 A1 * 2/2005 Barry et al. ................... 399/127
2005/0094208 A1 * 5/2005 Mori ............................ 358/1.18
2006/0088331 A1 4/2006 Inoue et al.
2008/0018936 A1 1/2008 Shinchi et al.
2008/0019713 A1 1/2008 Shinchi et al.
2009/0031235 A1 * 1/2009 Martin et al. ................. 715/765

(Continued)

FOREIGN PATENT DOCUMENTS

EP 1 246 051 10/2002

(Continued)

OTHER PUBLICATIONS

Notification of Reason for Refusal issued in the corresponding Japanese Patent Application No. 2008-155978 dated May 11, 2010, and an English Translation thereof.

(Continued)

*Primary Examiner* — Stephen Hong
*Assistant Examiner* — Asher Kells
(74) *Attorney, Agent, or Firm* — Buchanan Ingersoll & Rooney PC

(57) ABSTRACT

A tab sheet setting apparatus displays sheet images which correspond to sheets for consecutive two or more pages among a plurality of pages and a tab ear icon that functions as a tab image which corresponds to a tab of a tab sheet on an operating screen. In case when the tab image is moved and placed in a first area, which contains at least a sheet image of one page that is displayed on the operating screen, the sheet of the page indicated by the sheet image in the first area is decided to be the tab sheet. In case when the tab image is moved and placed in a second area, which is different from the first area and contains a midpoint of sheet images of two consecutive pages displayed on the operating screen, insertion of the tab sheet in between the two consecutive pages is decided.

16 Claims, 17 Drawing Sheets

U.S. PATENT DOCUMENTS

2009/0273804 A1* 11/2009 Kobashi ..................... 358/1.15

FOREIGN PATENT DOCUMENTS

| | | |
|---|---|---|
| JP | 2002-271567 A | 9/2002 |
| JP | 2006-120094 | 5/2006 |
| JP | 2006-293877 | 10/2006 |
| JP | 2008-023835 | 2/2008 |

OTHER PUBLICATIONS

European Search Report dated Oct. 22, 2010, issued in the corresponding European Patent Application No. 09155191.1-2209.

* cited by examiner

Figure 11:
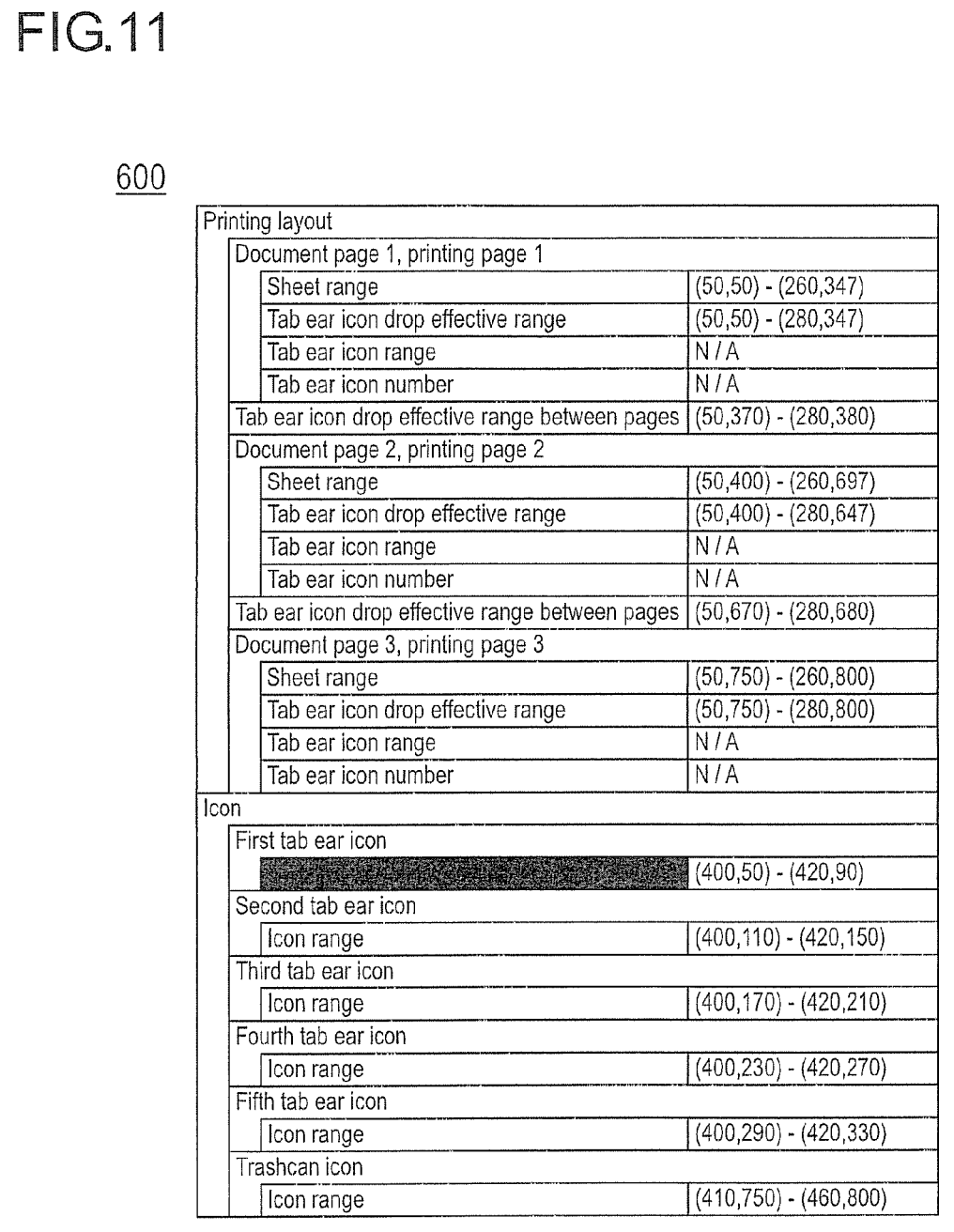

| | | | |
|---|---|---|---|
| Printing layout | | | |
| | Document page 1, printing page 1 | | |
| | | Sheet range | (50,50) - (260,347) |
| | | Tab ear icon drop effective range | (50,50) - (280,347) |
| | | Tab ear icon range | N / A |
| | | Tab ear icon number | N / A |
| | Tab ear icon drop effective range between pages | | (50,370) - (280,380) |
| | Document page 2, printing page 2 | | |
| | | Sheet range | (50,400) - (260,697) |
| | | Tab ear icon drop effective range | (50,400) - (280,647) |
| | | Tab ear icon range | N / A |
| | | Tab ear icon number | N / A |
| | Tab ear icon drop effective range between pages | | (50,670) - (280,680) |
| | Document page 3, printing page 3 | | |
| | | Sheet range | (50,750) - (260,800) |
| | | Tab ear icon drop effective range | (50,750) - (280,800) |
| | | Tab ear icon range | N / A |
| | | Tab ear icon number | N / A |
| Icon | | | |
| | First tab ear icon | | |
| | | [illegible] | (400,50) - (420,90) |
| | Second tab ear icon | | |
| | | Icon range | (400,110) - (420,150) |
| | Third tab ear icon | | |
| | | Icon range | (400,170) - (420,210) |
| | Fourth tab ear icon | | |
| | | Icon range | (400,230) - (420,270) |
| | Fifth tab ear icon | | |
| | | Icon range | (400,290) - (420,330) |
| | Trashcan icon | | |
| | | Icon range | (410,750) - (460,800) |

| Printing layout | | | |
|---|---|---|---|
| | Document page 1, printing page 1 | | |
| | | Sheet range | (50,50) - (260,347) |
| | | Tab ear icon drop effective range | (50,50) - (280,347) |
| | | Tab ear icon range | (260,50) - (280,347) |
| | | Tab ear icon number | 1 |
| | Tab ear icon drop effective range between pages | | (50,370) - (280,380) |
| | Document page 2, printing page 2 | | |
| | | Sheet range | (50,400) - (260,697) |
| | | Tab ear icon drop effective range | (50,400) - (280,647) |
| | | Tab ear icon range | N / A |
| | | Tab ear icon number | N / A |
| | Tab ear icon drop effective range between pages | | (50,670) - (280,680) |
| | Document page 3, printing page 3 | | |
| | | Sheet range | (50,750) - (260,800) |
| | | Tab ear icon drop effective range | (50,750) - (280,800) |
| | | Tab ear icon range | N / A |
| | | Tab ear icon number | N / A |
| Icon | | | |
| | First tab ear icon | | |
| | | | N / A |
| | Second tab ear icon | | |
| | | Icon range | (400,110) - (420,150) |
| | Third tab ear icon | | |
| | | Icon range | (400,170) - (420,210) |
| | Fourth tab ear icon | | |
| | | Icon range | (400,230) - (420,270) |
| | Fifth tab ear icon | | |
| | | Icon range | (400,290) - (420,330) |
| | Trashcan icon | | |
| | | Icon range | (410,750) - (460,800) |

| Printing layout | | | |
|---|---|---|---|
| | Document page 1, printing page 1 | | |
| | | Sheet range | (50,50) - (260,347) |
| | | Tab ear icon drop effective range | (50,50) - (280,347) |
| | | Tab ear icon range | N / A |
| | | Tab ear icon number | N / A |
| | Tab ear icon drop effective range between pages | | (50,370) - (280,380) |
| | Document page 0, printing page 2 | | |
| | | Sheet range | (50,400) - (260,697) |
| | | Tab ear icon drop effective range | (50,400) - (280,647) |
| | | Tab ear icon range | (260,400) - (280,440) |
| | | Tab ear icon number | 1 |
| | Tab ear icon drop effective range between pages | | (50,670) - (280,680) |
| | Document page 2, printing page 3 | | |
| | | Sheet range | (50,750) - (260,800) |
| | | Tab ear icon drop effective range | (50,750) - (280,800) |
| | | Tab ear icon range | N / A |
| | | Tab ear icon number | N / A |
| Icon | | | |
| | First tab ear icon | | |
| | | | N / A |
| | Second tab ear icon | | |
| | | Icon range | (400,110) - (420,150) |
| | Third tab ear icon | | |
| | | Icon range | (400,170) - (420,210) |
| | Fourth tab ear icon | | |
| | | Icon range | (400,230) - (420,270) |
| | Fifth tab ear icon | | |
| | | Icon range | (400,290) - (420,330) |
| | Trashcan icon | | |
| | | Icon range | (410,750) - (460,800) |

Job information

| Job ID | 00009317 |
|---|---|
| Job type | Print |
| User name | kiwada |
| Job name | patent.doc |
| Number of pages | 12 |
| No. of copies | 3 |
| Total number of tabs | 5 |
| Binding direction | Left bound |
| Gathering | Sort |
| Stapling | Off |
| Folding | Off |
| ... | ... |

Page information

| Document page number | 1 |
|---|---|
| Printing page number | 1 |
| Image size | 292x205mm |
| Paper size | A4(297x210mm) |
| Type of paper | Normal paper |
| Color mode | Color |
| Image orientation | Portrait |
| Designation of sheet feeding unit | AUTO |
| Single side/double side | Single side |
| Output tray | Main tray |
| ... | ... |

Page information

| Document page number | 2 |
|---|---|
| Printing page number | 2 |
| Image size | 292x205mm |
| Paper size | A4(297x210mm) |
| Type of paper | Normal paper |
| Color mode | Color |
| Image orientation | Portrait |
| Designation of sheet feeding unit | AUTO |
| Single side/double side | Single side |
| Output tray | Main tray |
| ... | ... |

Job information

| Job ID | 00009317 |
|---|---|
| Job type | Print |
| User name | kiwada |
| Job name | patent.doc |
| Number of pages | 12 |
| No. of copies | 3 |
| Total number of tabs | 5 |
| Binding direction | Left bound |
| Gathering | Sort |
| Stapling | Off |
| Folding | Off |
| ... | ... |

Page information

| Document page number | 1 |
|---|---|
| Printing page number | 1 |
| Image size | 292x222.7mm |
| Paper size | A4 Tab(297x222.7mm) |
| Tab number | 1 |
| Type of paper | Normal paper |
| Color mode | Color |
| Image orientation | Portrait |
| Designation of sheet feeding unit | AUTO |
| Single side/double side | Single side |
| Output tray | Main tray |
| ... | ... |

Page information

| Document page number | 2 |
|---|---|
| Printing page number | 2 |
| Image size | 292x205mm |
| Paper size | A4(297x210mm) |
| Type of paper | Normal paper |
| Color mode | Color |
| Image orientation | Portrait |
| Designation of sheet feeding unit | AUTO |
| Single side/double side | Single side |
| Output tray | Main tray |
| ... | ... |

Job information

| Job ID | 00009317 |
|---|---|
| Job type | Print |
| User name | kiwada |
| Job name | patent.doc |
| Number of pages | 12 |
| No. of copies | 3 |
| Total number of tabs | 5 |
| Binding direction | Left bound |
| Gathering | Sort |
| Stapling | Off |
| Folding | Off |
| ... | ... |

Page information

| Document page number | 1 |
|---|---|
| Printing page number | 1 |
| Image size | 292x205mm |
| Paper size | A4(297x210mm) |
| Type of paper | Normal paper |
| Color mode | Color |
| Image orientation | Portrait |
| Designation of sheet feeding unit | AUTO |
| Single side/double side | Single side |
| Output tray | Main tray |
| ... | ... |

Page information

| Document page number | 0(Insert) |
|---|---|
| Printing page number | 2 |
| Image size | 292x222.7mm |
| Paper size | A4 Tab(297x222.7mm) |
| Tab number | 1 |
| Type of paper | Normal paper |
| Color mode | Blank |
| Image orientation | N / A |
| Designation of sheet feeding unit | AUTO |
| Single side/double side | Single side |
| Output tray | Main tray |
| ... | ... |

Page information

| Document page number | 2 |
|---|---|
| Printing page number | 3 |
| Image size | 292x205mm |
| Paper size | A4(297x210mm) |
| Type of paper | Normal paper |
| Color mode | Color |
| Image orientation | Portrait |
| Designation of sheet feeding unit | AUTO |
| Single side/double side | Single side |
| Output tray | Main tray |
| ... | ... |

Job information

| Job ID | 00009317 |
|---|---|
| ···(Abbreviation) | ···(Abbreviation) |

Page information

| Document page number | 1 |
|---|---|
| Printing page number | 1 |
| Image size | 292x222.7mm |
| Paper size | A4 Tab(297x222.7mm) |
| Tab number | 1 |
| ···(Abbreviation) | ···(Abbreviation) |
| Output tray | Main tray |
| ···(Abbreviation) | ···(Abbreviation) |

Page information

| Document page number | 2 |
|---|---|
| Printing page number | 2 |
| Image size | 292x205mm |
| Paper size | A4(297x210mm) |
| ···(Abbreviation) | ···(Abbreviation) |
| Output tray | Main tray |
| ···(Abbreviation) | ···(Abbreviation) |

Page information

| Document page number | 0(Insert) |
|---|---|
| Printing page number | 3 |
| Image size | 292x222.7mm |
| Paper size | A4 Tab(297x222.7mm) |
| Tab number | 2 |
| ···(Abbreviation) | ···(Abbreviation) |
| Color mode | Blank |
| ···(Abbreviation) | ···(Abbreviation) |
| Output tray | Main tray |
| ···(Abbreviation) | ···(Abbreviation) |

Page information

| Document page number | 3 |
|---|---|
| Printing page number | 4 |
| Image size | 292x205mm |
| Paper size | A4(297x210mm) |
| ···(Abbreviation) | ···(Abbreviation) |
| Output tray | Main tray |
| ···(Abbreviation) | ···(Abbreviation) |

Page information

| Document page number | 4 |
|---|---|
| Printing page number | 5 |
| Image size | 292x222.7mm |
| Paper size | A4 Tab(297x222.7mm) |
| Tab number | 3 |
| ···(Abbreviation) | ···(Abbreviation) |
| Output tray | Main tray |
| ···(Abbreviation) | ···(Abbreviation) |

( It leads to upper right. )

( Continuation of lower left )

Page information

| Document page number | 5 |
|---|---|
| Printing page number | 6 |
| Image size | 292x205mm |
| Paper size | A4(297x210mm) |
| ···(Abbreviation) | ···(Abbreviation) |
| Output tray | Main tray |
| ···(Abbreviation) | ···(Abbreviation) |

Page information

| Document page number | 0(Insert) |
|---|---|
| Printing page number | 7 |
| Image size | 292x222.7mm |
| Paper size | A4 Tab(297x222.7mm) |
| Tab number | 4 |
| ···(Abbreviation) | ···(Abbreviation) |
| Color mode | Blank |
| ···(Abbreviation) | ···(Abbreviation) |
| Output tray | Sub tray |
| ···(Abbreviation) | ···(Abbreviation) |

Page information

| Document page number | 0(Insert) |
|---|---|
| Printing page number | 8 |
| Image size | 292x222.7mm |
| Paper size | A4 Tab(297x222.7mm) |
| Tab number | 5 |
| ···(Abbreviation) | ···(Abbreviation) |
| Color mode | Blank |
| ···(Abbreviation) | ···(Abbreviation) |
| Output tray | Sub tray |
| ···(Abbreviation) | ···(Abbreviation) |

Page information

| Document page number | 6 |
|---|---|
| Printing page number | 9 |
| Image size | 292x222.7mm |
| Paper size | A4 Tab(297x222.7mm) |
| Tab number | 1 |
| ···(Abbreviation) | ···(Abbreviation) |
| Output tray | Main tray |
| ···(Abbreviation) | ···(Abbreviation) |

⋮

USER INTERFACE FOR DESIGNATING A PAGE AS A TAB SHEET AND INSERTING A TAB SHEET BETWEEN PAGES

CROSS-REFERENCE TO RELATED APPLICATION

This application is based on Japanese Patent Application No. 2008-155978 filed on Jun. 13, 2008, the contents of which are incorporated herein by reference.

BACKGROUND

1. Technical Field

The present invention relates to a tab sheet setting apparatus, and a computer readable medium stored with a tab sheet setting program for specifying a setting concerning a tab sheet.

2. Description of Related Art

There exist image forming apparatuses such as copying machines and printers that are capable of creating printed products by using a tab sheet having a flat rectangular main body and a tab protruding at a specified position on a side of said main body.

There are two methods of using tab sheets, one to use a certain page from a plurality of pages that constitute a document as a tab sheet, and another to insert a tab sheet independent of the document in between pages of the document. In general, the user must specify certain pages in order to insert tab sheets if independent tab sheets are used, or specify certain pages from the pages of the document which will be used as tab sheets. See Unexamined Japanese Patent Publication No. 2002-271567.

However, a problem with the image forming apparatus described in the abovementioned patent publication is that the operations of specifying the pages to be used as tab sheets or to specify insertion are too complex and difficult to use when the user wanted to use tab sheet.

SUMMARY

It is an object of the present invention to provide a tab sheet setting apparatus, and a computer readable recording medium stored with a tab sheet setting program, all of which are improved to solve at least one of the abovementioned problems.

It is another object of the present invention to provide a tab sheet setting apparatus, and a computer readable recording medium stored with a tab sheet setting program that enables a user to execute tab sheet setting operation easily and securely.

To achieve at least one of the abovementioned objects, a tab sheet setting apparatus reflecting one aspect of the present invention comprises: a display unit for displaying sheet images which correspond to sheets for consecutive two or more pages among a plurality of pages and a tab image which corresponds to a tab of a tab sheet on an operating screen; a first deciding unit for deciding, in case when said tab image is moved and placed in a first area, which contains at least a sheet image of one page that is displayed on the operating screen, the sheet of the page indicated by the sheet image in the first area to be the tab sheet; and a second deciding unit for deciding, in case when said tab image is moved and placed in a second area, which is different from said first area and contains a midpoint of sheet images of two consecutive pages displayed on said operating screen, to insert the tab sheet between said two consecutive pages.

In said tab sheeting setting apparatus, it is preferable that said tab image is a tab image which corresponds to a tab of a tab sheet and makes the tab position on the tab sheet identifiable on the operating screen; said first deciding unit decides the sheet of the page indicated by the sheet image in said first area to be the tab sheet on which the tab position indicated by said tab image is specified; and said second deciding unit decides the insertion of the tab sheet, on which the tab position indicated by said tab image is specified, in between said two consecutive pages.

In said tab sheeting setting apparatus, it is preferable that when the sheet of the page indicated by the sheet image in the first area is decided to be the tab sheet by said first deciding unit, said display unit displays a sheet image which corresponds to said tab sheet by correcting the sheet image in the first area to the tab sheet image; and when the insertion of the tab sheet between said two consecutive pages is decided by said second deciding unit, said display unit displays a tab sheet image which corresponds to said tab sheet by placing the tab sheet image in between said two consecutive pages.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 11 is a diagram showing an example of the location and range information of each object in a printing layout area and an icon area.

FIG. 12 is a diagram showing an example of the location and range information of each object when the sheets of document pages are specified as tab sheets.

FIG. 13 is a diagram showing an example of the location and range information of each object when it is decided to insert a tab sheet between two consecutive pages of the document.

FIG. 14 is a diagram showing an example of printing job information.

FIG. 15 is a diagram showing an example of the printing job information when the sheets of document pages are specified as tab sheets.

FIG. 16 is a diagram showing an example of the printing job information of each object when it is decided to insert a tab sheet between two consecutive pages of the document.

FIG. 17 is a diagram showing an example of printing job when a tab sheet which corresponds to a tab ear icon thrown into a waste basket is specified as a useless tab sheet.

DETAILED DESCRIPTION

The embodiment of this invention will be described below with reference to the accompanying drawings.

Figure 1:
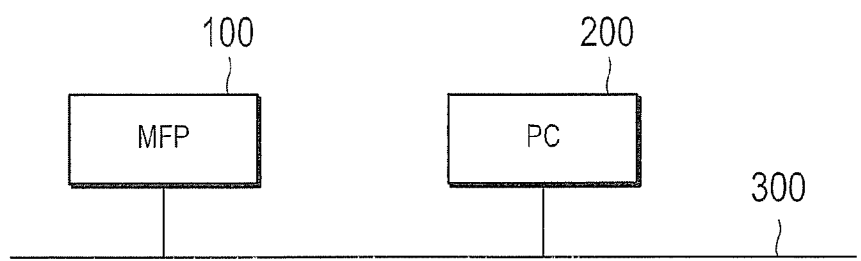
FIG. 1 is a block diagram showing the overall constitution of an image processing system according to an embodiment of the present invention.

FIG. 1 is a block diagram showing the overall constitution of an image processing system according to an embodiment of the present invention.

The image processing system shown in FIG. 1 is equipped with an MFP (Multi-Function Peripheral) 100 that functions as an image forming apparatus and a PC (personal computer) 200 that functions as a network terminal, all of which are connected via a network 300 to be able to communicate with each other.

The types and the number of equipment to be connected to the network 300 are not limited to those shown in FIG. 1. Also, the MFP 100 and the PC 200 can be connected directly (local connection) without recourse to the network 300.

Figure 2:
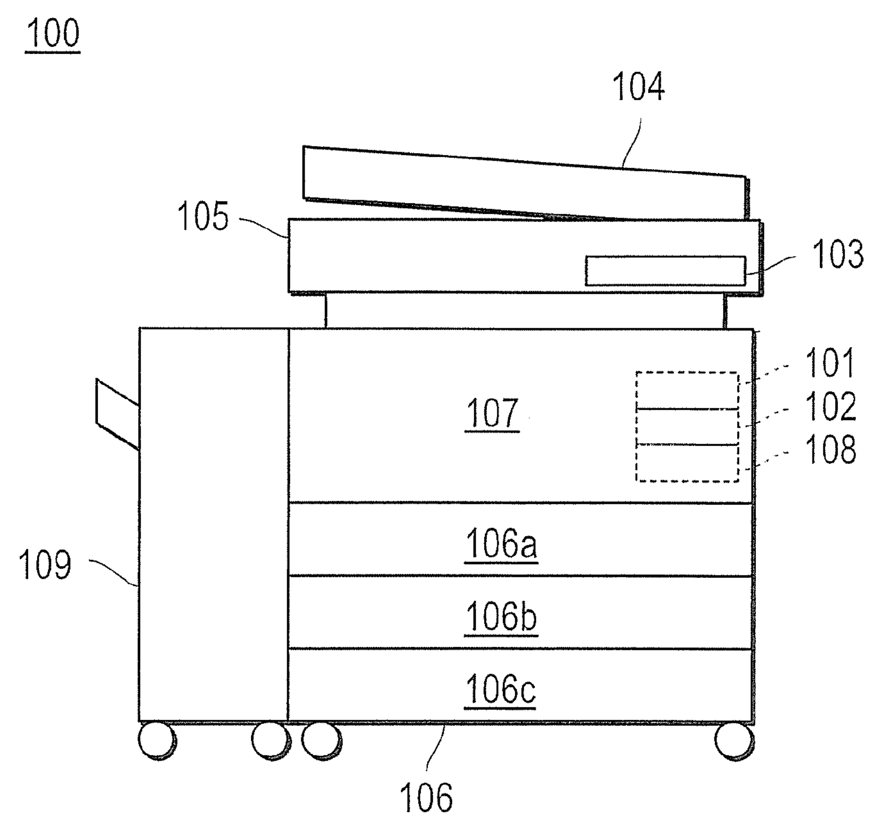
FIG. 2 is a front view showing the outline constitution of the MFP shown in FIG. 1.
Figure 3:
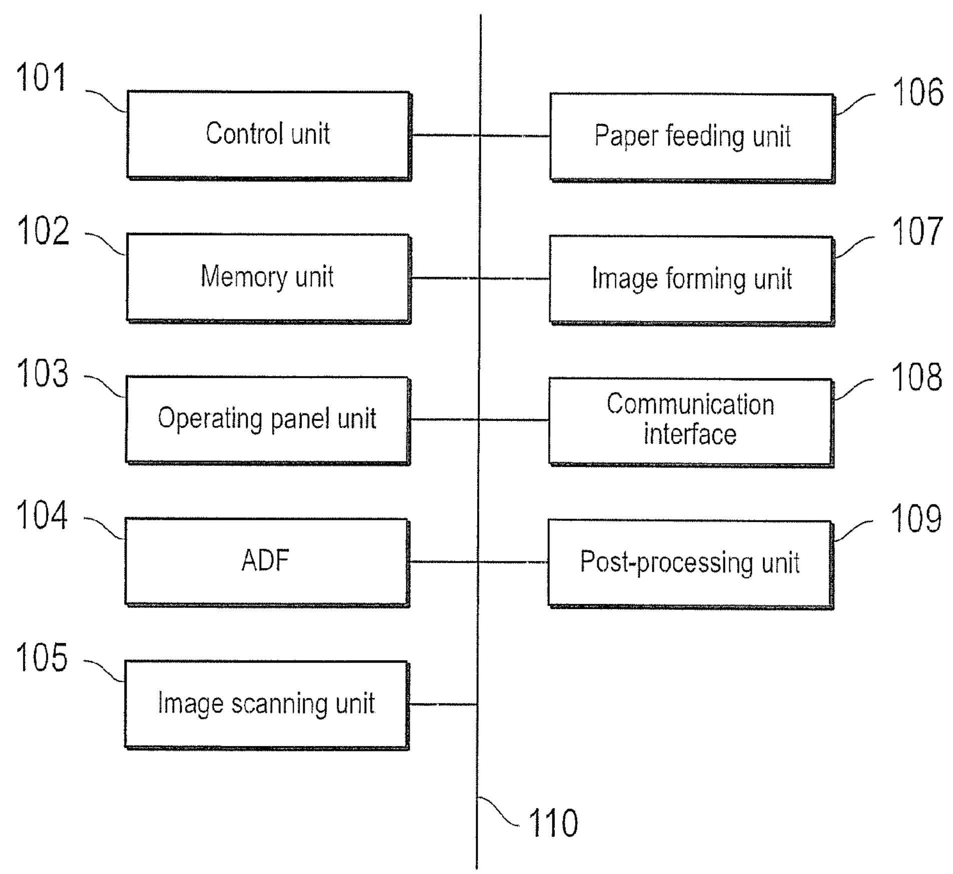
FIG. 3 is a block diagram showing the constitution of the MFP shown in FIG. 1.

FIG. 2 is a schematic front view showing an external view of the MFP shown in FIG. 1, and FIG. 3 is a block diagram showing the constitution of the MFP shown in FIG. 1.

The MFP 100 is equipped with a control unit 101, a memory unit 102, an operating panel unit 103, an ADF (Auto Document Feeder) 104, an image scanning unit 105, a paper feeding unit 106, an image forming unit 107, a communication interface 108, and a post-processing unit 109, all of which are interconnected via a bus 110 for exchanging signals with each other.

The control unit 101 is a CPU, and controls various parts indicated above and executes various arithmetic processes according to a program. The memory unit 102 consists of a ROM for storing various programs and data, a RAM for temporarily storing programs and data as a working area, a hard disk for storing various programs and data including an operating system, etc.

The operating panel unit 103 is equipped with a touch panel, a ten-key pad, a start button, a stop button and others to be used for displaying various data and entering various instructions.

The ADF 104 transports a single or multiple sheets of paper one sheet at a time to a specified scanning position of the image scanning unit 105, and discharges the document sequentially after scanning it.

The image scanning unit 105 irradiates a document set on the specified scanning position or transported to the specified scanning location by the ADF 104 with a light source such as a fluorescent lamp and the like, converts reflected lights from the document surface into electrical signals with the help of imaging devices such as CCD image sensors, and generates image data from the electrical signals.

The paper feeding units 106*a* through 106*c* contain paper which is used as recording media in the printing process. The paper feeding unit 106 (integral name for 106*a* through 106*c*) feeds the contained paper to the image forming unit 107 one sheet at a time.

The image forming unit 107 prints various data on paper using a known imaging process such as the electronic photographic process including such processes as electrical charging, exposure, developing, transferring and fixing.

The communication interface unit 108 is an interface for communicating with external equipment, and network interfaces such as Ethernet, Token Ring, and FDDI standards, serial interfaces such as USB and IEEE 1394, parallel interfaces such as SCSI and IEEE 1284, wireless communication interfaces such as Bluetooth®, IEEE 802.11, HomeRF®, and IrDA®, as well as telephone circuit interfaces for connection to telephone circuits can be used.

The post-processing unit 109 conducts finishing processes to be applied to the printed paper transferred from the image forming unit 107. The finishing process includes, for example, a stapling process for stapling a bundle of paper, a punching process for punching holes at paper edges for filing purpose, a bookbinding process for forming a book, a folding process for folding paper, and a trimming process for trimming edges of paper.

The MFP 100 has the printing function for printing according to an instruction form an external device such as the PC 200 or a cellular telephone, and the copying function for copying documents.

Figure 4:
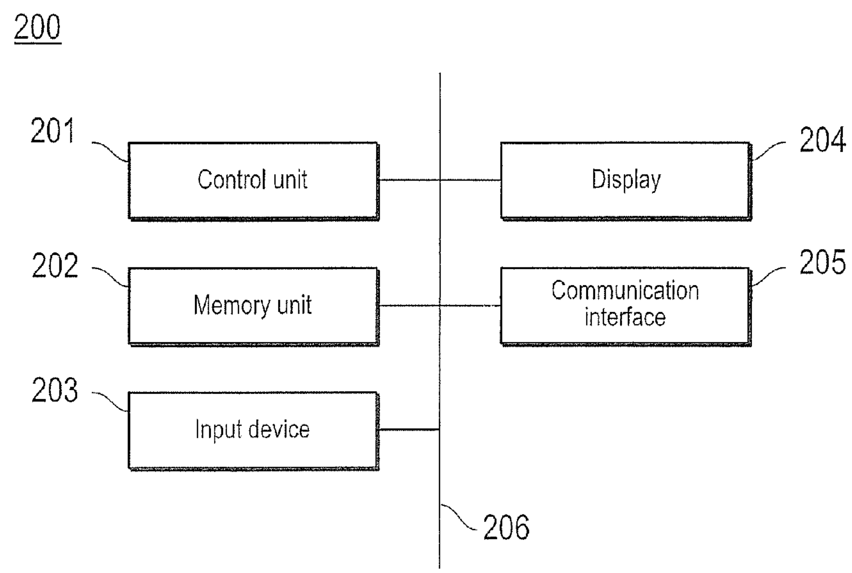
FIG. 4 is a block diagram showing the constitution of the PC shown in FIG. 1.

FIG. 4 is a block diagram showing the constitution of the PC shown in FIG. 1.

The PC 200 contains a controlling unit 201, a memory unit 202, an input device 203, a display 204, and a communication interface 205, all of which are interconnected via a bus 206 for exchanging signals. The descriptions of those parts of the PC 200 that have the same functions as those of the corresponding parts of the MFP 100 are omitted here to avoid unnecessary duplication.

The memory unit 202 has an application program for generating document files and a printer driver for converting the document files into print data described in a language understood by the MFP 100.

The input device 203 includes a pointing device such as a mouse, a keyboard, and others, and is used for executing various kinds of inputs. The display 204 is typically a liquid crystal display and displays various kinds of information.

The MFP 100 and the PC 200 can each contain constitutional elements other than those described above, or may lack a portion of the abovementioned elements.

The network 300 can be a LAN connecting computers and network equipment according to standards such as Ethernet, Token Ring, and FDDI, or a WAN that consists of several LANs connected by a dedicated line.

Figure 5:
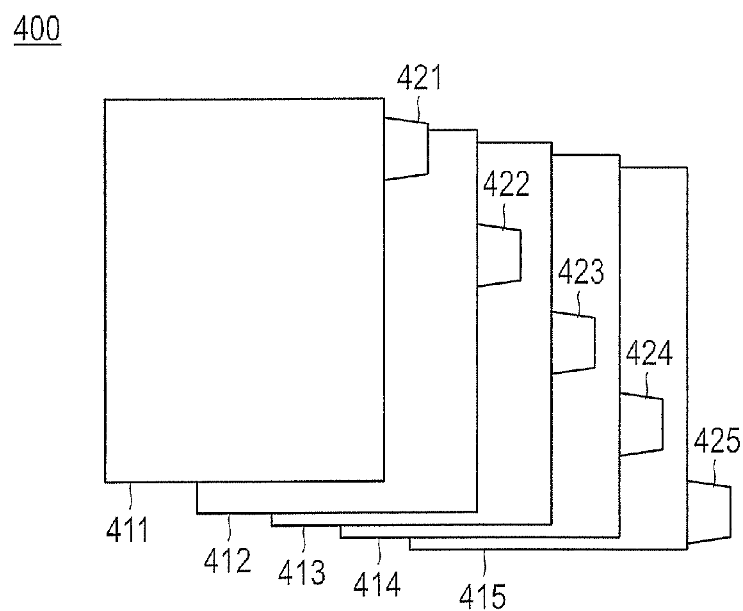
FIG. 5 is a diagram showing examples of tab sheets used in this embodiment.

FIG. 5 is a diagram showing examples of tab sheets used in this embodiment. Tab sheets are also called index sheets. As shown in FIG. 5, the tab sheet 400 is a set of five tab sheets 411-415 and is called a “five-tab.” Each of the tab sheets 411-415 has a flat rectangular main body and a tab 421-425 respectively protruding at a specified position on a side of said may body. However, it goes without saying that other tab sheet sets consisting of arbitrary number of sheets (e.g., three sheets) can be used in the present embodiment.

The order of the tab sheets shown in FIG. 5 is called the normal order and is arranged in such a way that the tab of an upper layer sheet is found above the tab of a lower layer sheet in FIG. 5 when all of their tabs are on the right side. In case of the five-tab tab sheet 400, the tabs 421-425 are provided on one side of the main body lowering their positions sequentially in five steps from the top to the bottom. The position of the tab 421 is called ⅕ (tab number “1”), the position of the tab 422 is called ⅖ (tab number “2”), the position of the tab 423 is called ⅗ (tab number “3”), the position of the tab 424 is called ⅘ (tab number “4”), and the position of the tab 425 is called 5/5 (tab number “5”) here. The tab sheets 400 are normally provided in multiple sets in the sheet supply tray.

The operation of the image processing system in this embodiment will be described in the following.

Figure 6:
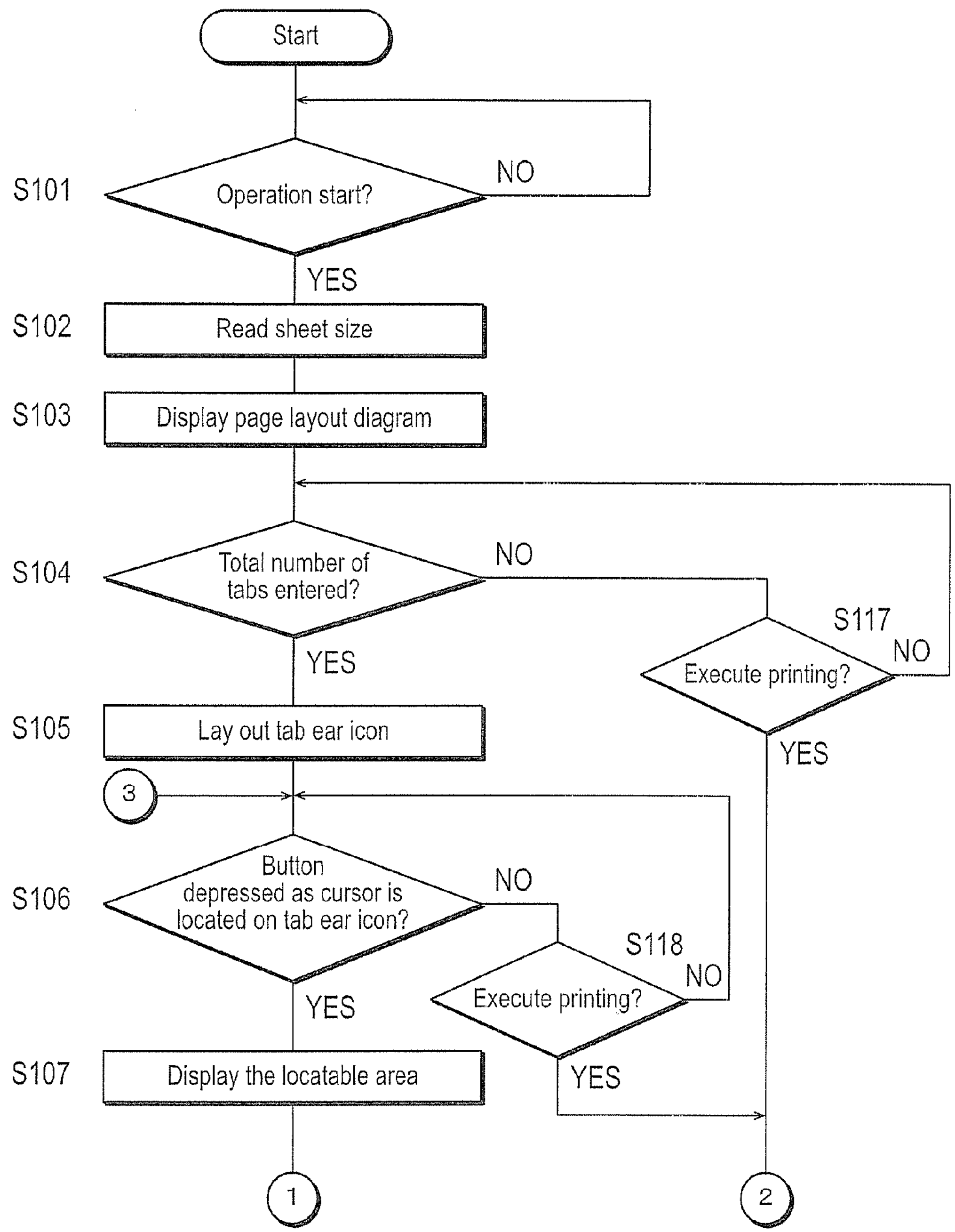
FIG. 6 is a flowchart showing the sequence of the transmission process for the printing job.
Figure 7:
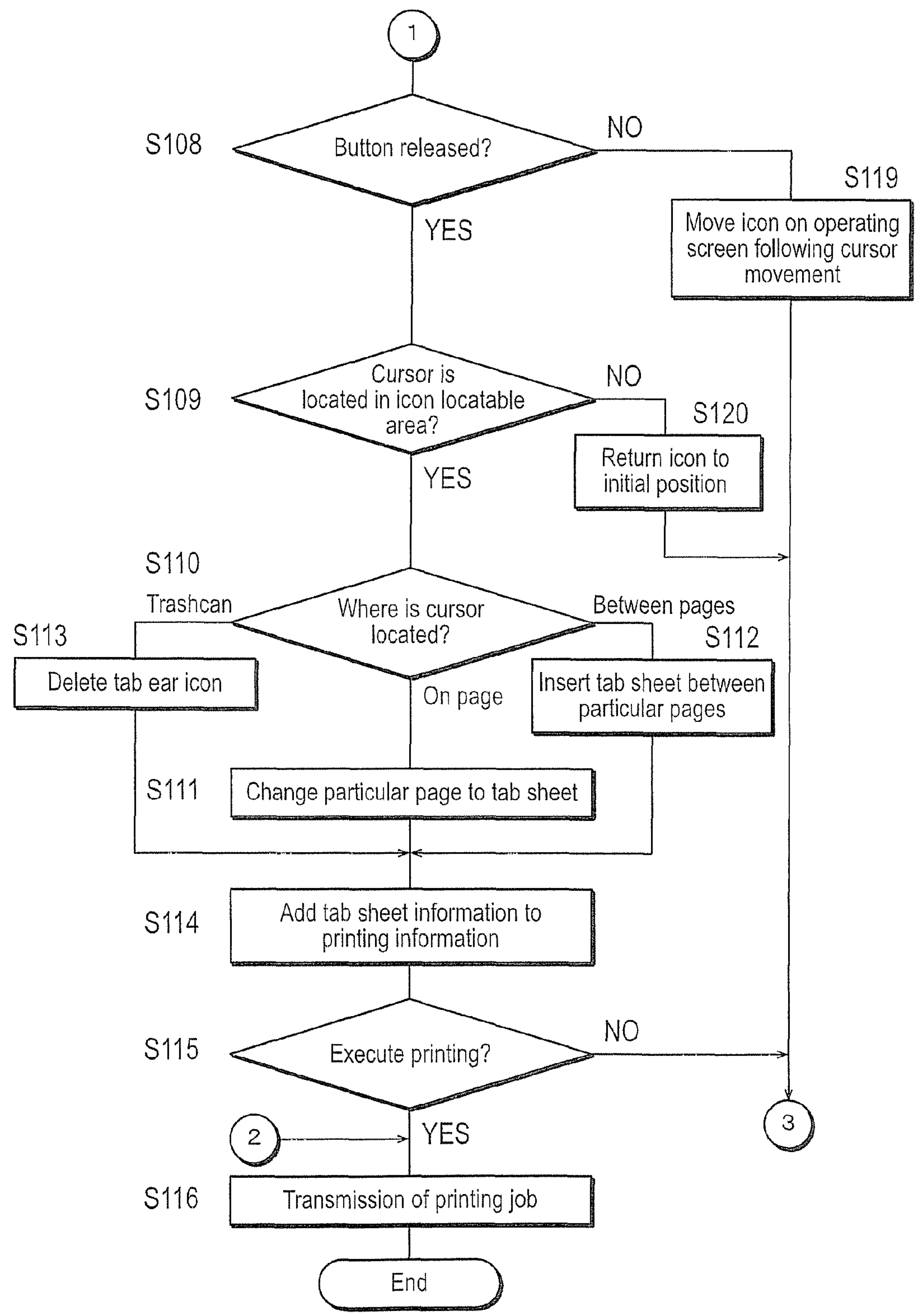
FIG. 7 is a flow chart showing the procedure of printing job transmission process continued from FIG. 6.

FIG. 6 and FIG. 7 area flowchart showing the sequence of transmission process of a printing job in the PC 200. The algorithm shown in the flowchart of FIGS. 6 and 7 is stored as a program in the memory unit 202 of the PC 200 and executed by the control unit 201.

First, the control unit 201 of the PC 200 makes a judgment as to whether or not an instruction for operation start is received from the input device 203 caused by the user's operation on the printer driver or a printing utility (S101).

Figure 8:
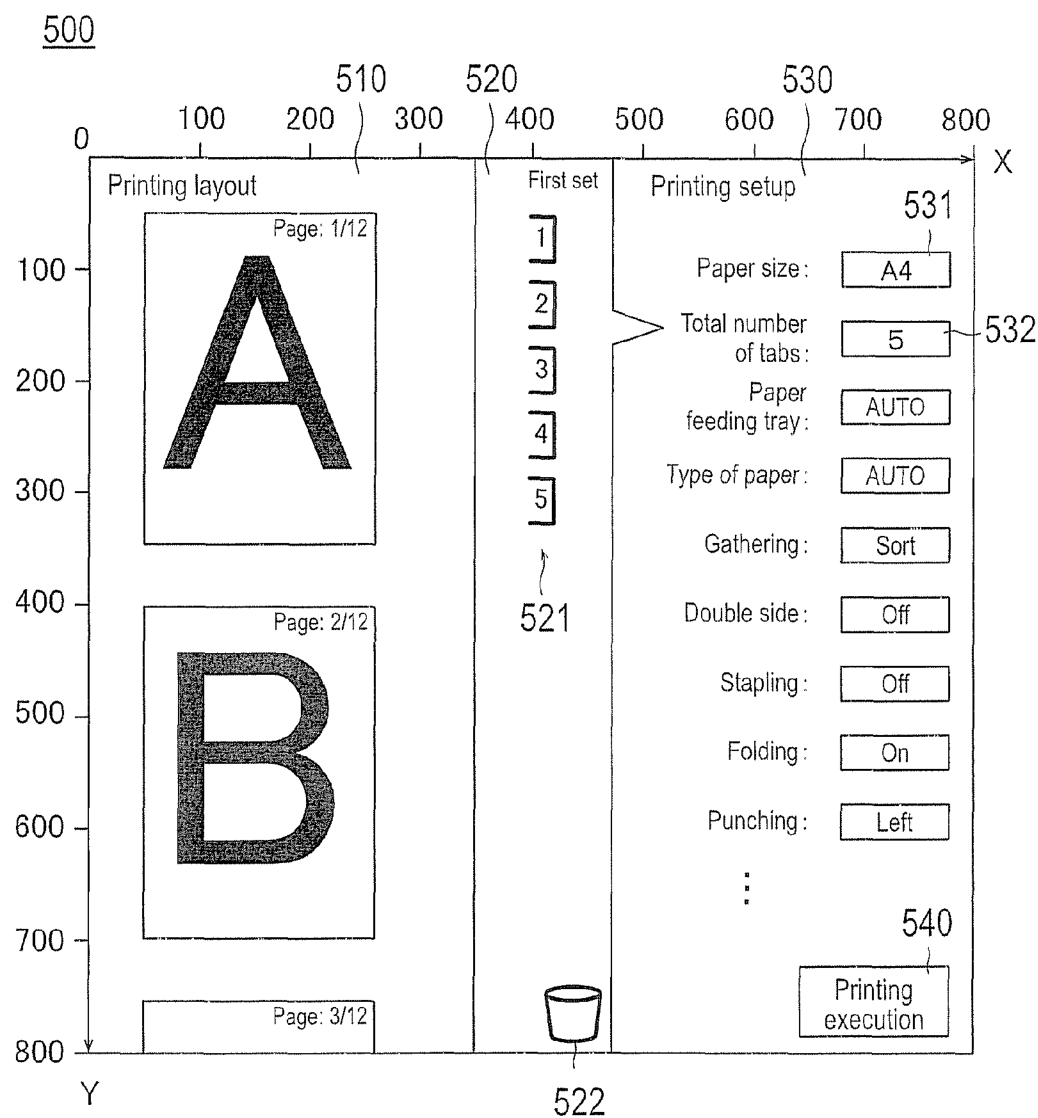
FIG. 8 is a diagram showing an example of the operating screen.

FIG. 8 is a diagram showing an example of the operating screen.

The operating screen 500 shown in FIG. 8 has a printing setup part 530 for setting various items concerning printing setup, a printing layout area 510, and an icon area 520.

The printing setup part 530 contains a sheet size specifying part 531 for specifying a sheet size to be used, a tab total number specifying part 532 for specifying the total number of tabs for one set of tab sheets to be used, and a plurality of specifying parts for specifying various printing setup items. The printing setup part 530 has a printing execution button 540 for instructing printing execution.

The printing layout area 510 is an area for displaying sheet images corresponding to at least certain pages among a plurality of pages. The sheet image here is intended to predict a status after printing.

The icon area 520 is an area for displaying various icons such as tab images (hereinafter each called "tab ear iron") 521 corresponding to tab sheets intended to be used and a trashcan image (hereinafter called "trashcan icon") 522.

If an instruction for operation start is received (S101: Yes), the control unit 201 reads the "sheet size" specified by the sheet size specifying part 531 of the printing setup part 530 on the operating screen 500 displayed on the display 204 based on the user's operation into the memory unit 202 (S102).

Next, the layout of the sheet image corresponding to the sheet size read in the above, i.e., the page layout drawing, is displayed on the printing layout area 510 on the operating screen 500 (S103).

In step S104, a judgment is made as to whether or not a value of 1 or higher value is specified in the tab total number specifying part 532 of the printing setup part 530 on the operating screen 500.

If a value of 1 or higher value is not specified in the tab total number specifying part 532 (S104: No), a judgment is made as to whether or not printing execution is judge by depressing the printing execution button 540 (S117). If an instruction for printing execution is received (S117: Yes), the program advances to step S116, while fan instruction for printing execution is not received (S117: No), the program returns to step S104.

On the other hand, if a value of 1 or higher is specified (S104: Yes) in the total number of tabs specifying part 532, the tab ear icons 521 corresponding to one set of tab sheets equivalent to the number of the value is displayed in the icon area 520 on the operating screen 500 (S105).

Alternatively, the total number of tabs can be acquired by being set up on the operating panel unit 103 of the MFP 100 and transmitted to the memory unit 202 of the PC 200 via the network 300.

On the operating screen 500, the printing layout area 510 and the icon area 520 have coordinate axes. The layout diagrams of each tab ear icon 521 and the page have positional information and range information expressed by coordinate values.

FIG. 11 is a diagram showing an example of the location and range information 600 of each object in the printing layout area and the icon area. The coordinate information of each object displayed on the display 204 is stored in the memory unit 202. The user can position the tab ear iron 521 by moving it by operating a cursor with the mouse and the like of the input device 203 based on the coordinate information of each object stored in the memory unit 202.

For example, the tab ear icon 521 becomes movable on the operating screen 500 when the mouse button is depressed while the cursor is overlapping the tab ear icon 521, the cursor is moved while the mouse button is kept depressed, and the tab ear icon 521 cab be located on a specific position by releasing the mouse button when the cursor is located in an area where it can be located (drag & drop).

Although various printing setups are executed in the printing setup part 530, the printing layout area 510, and the icon area 520, only the judgment as to whether or not the tab sheet usage specification is executed and the process following the judgment will be described here.

In step S106, a judgment is made as to whether or not the mouse button is depressed when the cursor is located on the tab ear icon 521.

If the mouse button is not depressed while the cursor is located on the tab ear icon 521 (S106: No), a judgment is made as to whether or not printing is executed by depressing the printing execution button 540 (S118). If an instruction for printing execution is received (S118: Yes), the program advances to step S116, while if an instruction for printing execution is not received (S118: No), the program returns to step S106.

On the other hand, if the mouse button is depressed while the cursor is located on the tab ear icon 521 (S106: Yes), the areas where the particular tab ear icon 521 can be located are indicated by rectangular lines drawing on the printing layout area S510 (S107). The area where the tab ear icon 521 can be located is acquired from the "tab ear icon droppable range" in the position and range information of FIG. 11.

In the present embodiment, one of the areas where the tab ear icon 521 can be located includes the sheet image of each page displayed on the printing layout area 510 and a predetermined area of vicinity of the particular sheet image. Also, one of the areas where the tab ear icon 521 can be located includes the middle point of the sheet images of the two consecutive pages displayed on the printing layout area 510 and has a predetermined area of vicinity of the particular middle point. The area that includes the trashcan icon 522 and the predetermined vicinity of the particular trashcan icon is always an area where the tab ear icon 521 can be located.

With reference to FIG. 7, in step S108, a judgment is made as to whether or not the mouse button of the input device 203 is released.

If it is judged that the mouse button of the input device 203 has not been released (S108: No), the tab ear icon 521 moves on the operating screen 500 as the cursor is moved (S119), and the program returns to step S108.

On the other hand, if it is judged that the mouse button of the input device 203 is released (S108: Yes), a judgment is made as to whether the cursor position is in an icon locatable area or not (S109).

If the cursor position is not in an icon locatable area (S109: No) when the mouse button is released, the tab ear icon 521 returns to the position where it was originally within the icon area 520 (S120), the program returns to step S106 shown in FIG. 6.

On the other hand, if the cursor position is within an icon locatable area (S109: Yes) when the mouse button is released, a judgment is made as to which of the icon locatable areas the cursor is located when the mouse button is released (S110).

If it is judged that the cursor is located in an area that includes the sheet image of a certain page displayed on the printing layout area 510 and the predetermined area of vicinity of the particular sheet image (S110: on the page), the sheet of the page indicated by the sheet image in the particular area is decided to be a tab sheet (S111). However, it can be alternatively constituted in such a way that only when it is judged that the cursor is located on the sheet image of a certain page, the sheet of the page indicated by the sheet image in the particular area is decided to be a tab sheet.

Figure 9:
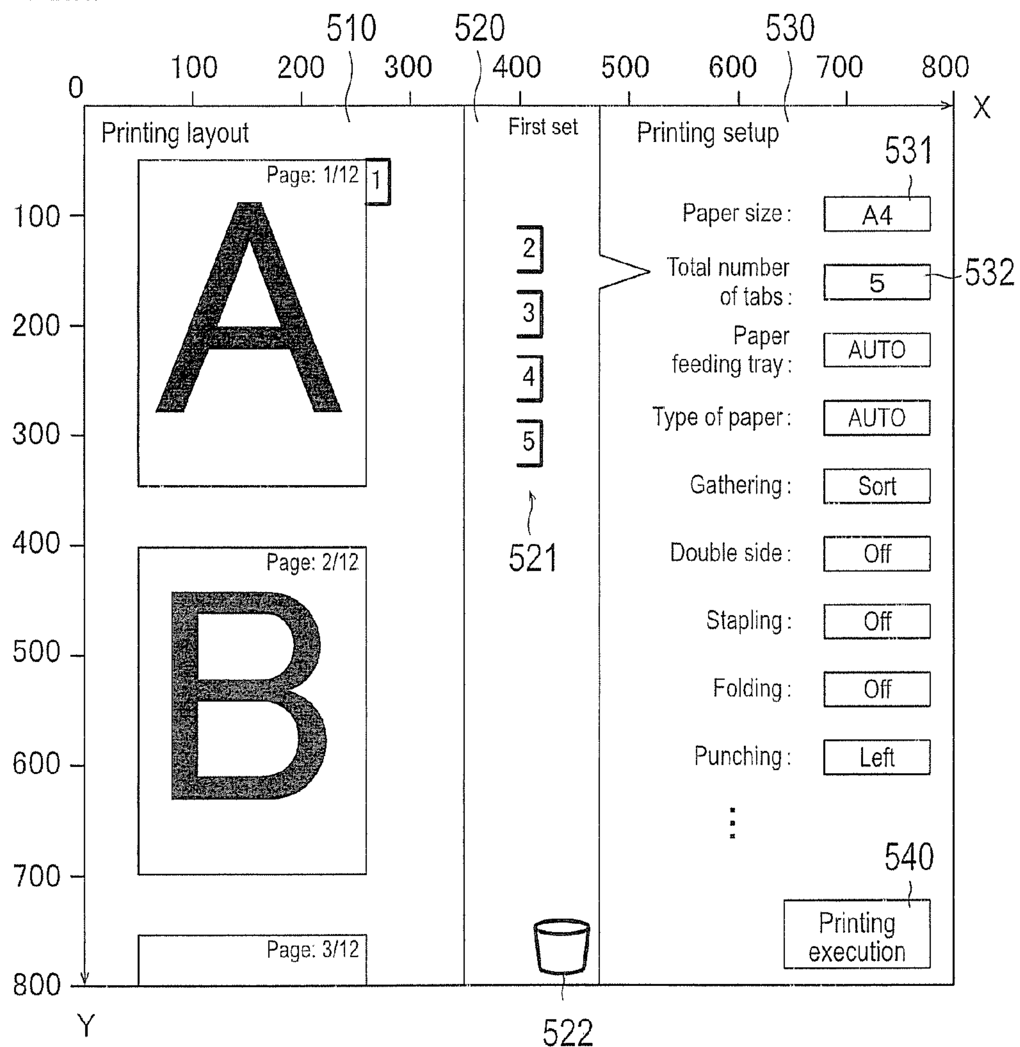
FIG. 9 is an example of the operating screen in case when a printing sheet image is changed to a tab sheet image.

The sheet image within the particular area is modified to be the tab sheet image corresponding to the tab sheet to be displayed (refer to operating screen 500*a* of FIG. 9). This makes it possible for the user to confirm the operating result easily. The tab position of in the tab sheet image is located at the tab position indicated by the dragged and dropped tab ear icon 521 (tab number). The position and range information of each object in the icon area and the printing layout area are changed (refer to position and range information 600*a* of FIG. 12).

On the other hand, if it is judged that the cursor is located in an area that includes a midpoint of the sheet images of two consecutive pages displayed on the printing layout area 510 and the predetermined area of vicinity of the particular midpoint (S110: in between pages), the tab sheet insertion between the particular two consecutive pages is decided (S112). Alternatively, it can also be constituted in such a way that the tab sheet insertion is decided in between the particular two consecutive pages, only when the cursor position is judged to be located between certain two consecutive pages (a rectangular formed between the sheet images of the two pages including the two opposing sides).

Figure 10:
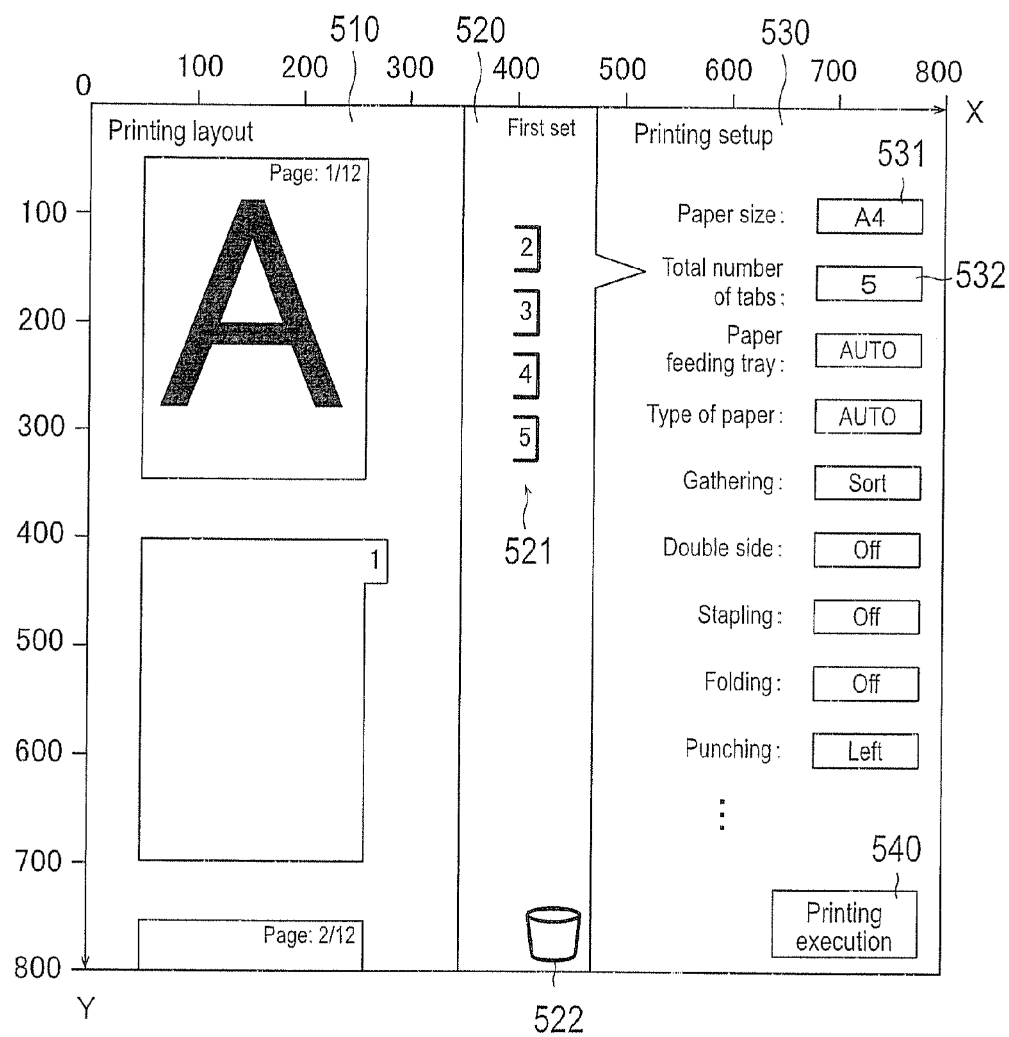
FIG. 10 is a diagram showing an example of the operating screen when a tab sheet image corresponding to a tab sheet is located between two consecutive pages.

The tab sheet image corresponding to the tab sheet is placed and displayed between the particular two consecutive pages (refer to operating screen 500*b* of FIG. 10). This makes it possible for the user to confirm the operating result easily. The tab position of in the tab sheet image is located at the tab position indicated by the dragged and dropped tab ear icon 521 (tab number). The position and range information of each object in the icon area and the printing layout area are changed (refer to position and range information 600*b* of FIG. 13).

On the other hand, if the cursor position is judged to include the trashcan icon 522 displayed in the icon area 520 and the predetermined vicinity of the particular trashcan icon (S110: trashcan), the drag & dropped tab ear icon 521 is discarded in the trashcan to be deleted (S113). Thus, the tab sheet that corresponds to the deleted tab ear icon 521 is determined as a tab sheet that became no longer necessary.

In step S114, the setting information concerning the tab sheet specified based on the user's operation on the operating screen 50, is added to the printing job information.

FIG. 14 is a diagram showing an example of printing job information. As shown in FIG. 14, the printing job information 700 contains job information that is information concerning the entire printing job and page information that is the page by page information.

As shown in the printing job information 700*a* of FIG. 15, if the sheet of a page of the document is decided to be used as a tab sheet, the sheet size item is changed to the tab sheet size. In the printing job information 700*a* of FIG. 15, an image is printed to the tab (tab ear) portion as well, so that the tab sheet size is treated as an image area with no blank. The printing job information 700*a* also has the tab number that indicates the tab position as information.

As shown in the printing job information 700*b* of FIG. 16, the sheet size item is inserted into a blank page, which is of the tab sheet size, if the insertion of the tab sheet between the two consecutive pages of the document is determined.

If the tab ear icon 521 is discarded into the trashcan and deleted, it is possible to manage to identify which number sheet of which number of set is the tab sheet that corresponds to the tab ear icon 521, which is discarded into the trashcan, but no problem occurs if no such management is done.

As shown in the printing job information 700*c* of FIG. 17, the tab sheet that corresponds to the tab ear icon 521 that is discarded to the trashcan is discharged as a tab sheet that became no longer necessary to an output tray (sub tray of FIG. 17) separate and different from the tray used for the body text of the document. However, there is no need to identify the tab sheet using a special flag indicating it as a tab sheet that became no longer necessary. In this case, when the printing job information is analyzed in the order of pages and if the tab number of the tab sheet that appears next to the tab sheet with a tab number of "3" is "1" in case, for example, when the 5-tab tab sheets (total number of tab sheets is "5") is used, the tab sheets with the tab numbers of "4" and "5" become no longer necessary, because it can be handled by a judgment that they are to be discharged to another tray (refer to FIG. 17).

In step S115, a judgment is made as to whether or not a series of operations by the user on the operating panel is completed on the operating screen 500 and printing execution is instructed by the depressing of the printing execution button 540. If an instruction for printing execution is received (S115: Yes), the program advances to step S116, while if an instruction for printing execution is not received (S115: No), the program returns to step S106.

In step S116, the printing job including the printing job information (refer to FIG. 14 through FIG. 17) is transmitted to the MFP 100 via the communication interface 205. The printing job here consists of printing job information concerning color image data, consisting of, for example, four color data of C (cyan), Y (yellow), M (magenta) and K (black).

Although it is not indicated in the flow charts of FIG. 6 and FIG. 7, once the tab ear icon 521 is located in the printing layout area 510, it can be relocated on another page or in between other pages, or to be returned to the initial location of the icon area 520 by being dragged and dropped again by the user. The user's operating convenience can be improved this way. In this case, the setting after the change is reflected on the printing job information simultaneous with the relocation process of the tab ear icon 521.

Although it is not shown in the flowcharts of FIG. 6 and FIG. 7, the second set of the tab era icons 521 of the icon area 520 can be indicated after all the elements of the first set is laid out in the printing layout area 510. Alternatively, a plurality of sets of the tab ear icon 521 can be laid out in the icon area 520 ready to be used.

Although it is not shown in the flowcharts of FIG. 6 and FIG. 7, the user can scroll the page displayed in the printing layout area 510 up and down, and operate on any page.

Moreover, the operation for the abovementioned setting of tab sheets can be done not only on the PC 200 that works as a network terminal but also on the operating panel unit 103 of the MFP 100. Also, the abovementioned operation on the setting of the tab sheet can be applied not only on printing process but also on copying process.

Figure 18:
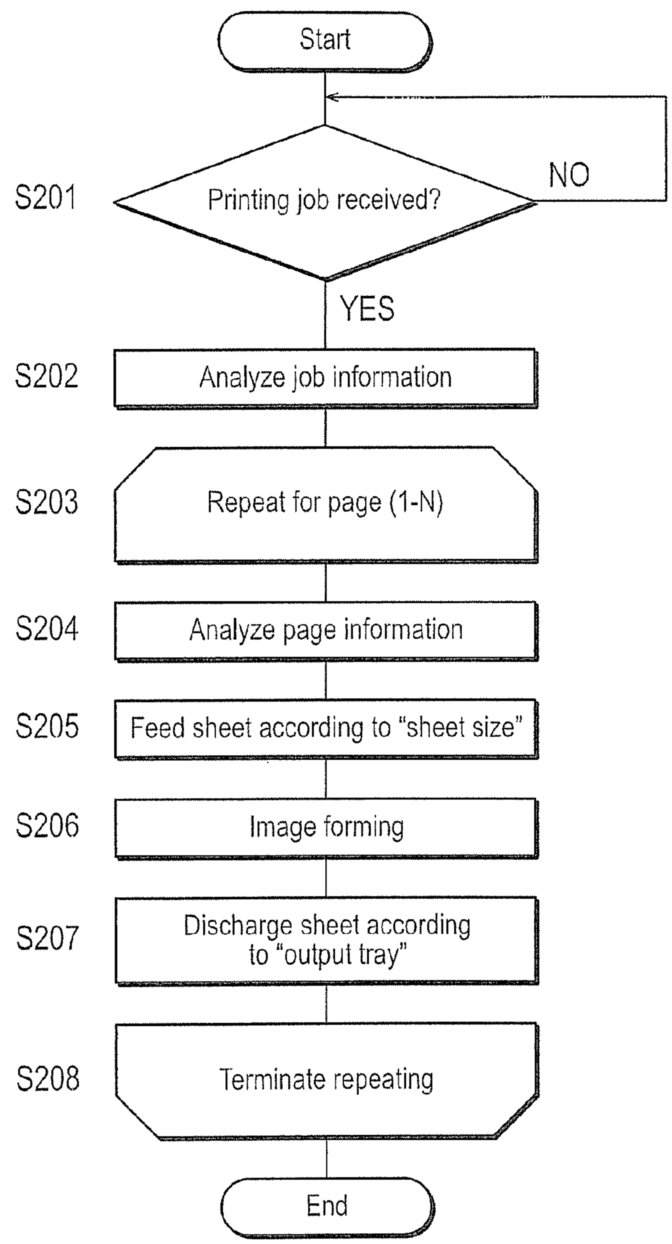
FIG. 18 is a flowchart showing the process sequence in the MFP for receiving printing job.

FIG. 18 is a flowchart showing the process sequence in the MFP 100 for receiving printing job. The algorithm shown in the flow chart of FIG. 18 is stored as a program in the memory unit 102 of the MFP 100 and executed by the control unit 101.

In the copying process, a document sheet is placed on the ADF 104 of the MFP 100 or the document table of the image scanning unit 105, and the user depress the copy start button of the operating panel unit 103. On the other hand, in the network print process, a printing job is received from the network 300 via the communication interface 108 of the MFP 100. This makes the MFP 100 to feed the paper from the designated paper feeding unit 106 so that the formed image can be printed.

In this description, both the image data obtained from the image scanning unit 105 by scanning the document in the copying process and the printing job received from the communication interface 108 in the network printing process are called integrally and indistinctly "print job."

The printing job is stored temporarily in the RAM of the memory unit 102 and is converted on the RAM into printing image data that can be formed into an image on a printing sheet in the image forming unit 107. Various programs for converting the print job into printing image data that can be formed into an image are stored in the hard disk of the memory unit 102 and a necessary program is read by the control unit 101.

The control unit 101 waits for a print job to be received (S201: No).

When it is judged that a print job is received (S201: Yes), the control unit 101 analyzes the job information contained in the print job (refer to FIG. 14 through FIG. 17) on the RAM of the storage unit 102 (S202).

The processing loop then starts page by page for a plurality of pages contained in the print job (S203).

First, the page information is analyzed (S204).

Next, a sheet of paper is supplied based on the "sheet size" of the page information from the sheet feeding unit 106 in which the particular size of paper is stored. In general, various sheets of paper satisfying various conditions such as other attributes of printing paper, e.g., "sheet type," and other designations of particular sheet feeding units (106*a*-106*c*) are supplied. However, for the sake of the simplicity of explanation, a judgment is made only on the "sheet size" that relates to whether or not the tab sheet size is indicated.

Next, an image forming process is executed by the image forming unit 107 on the supplied sheet (S206). However, although it is not shown in the flowchart of FIG. 18, the image forming process is skipped, allowing only the sheet feeding, if the "color mode" item of the page information is "blank" (refer to FIG. 16, etc.).

The sheet, on which the image forming is completed, is then discharged to an appropriate output tray of the post-processing unit 109 based on the "output tray" of the page information (S207).

When it is judged in step S208 that the steps of S204 through S207 are repeated on all pages, the process of FIG. 18 is terminated.

Thus, in the present embodiment, the PC 200, which functions as a tab sheet setting apparatus, displays sheet images which correspond to sheets for consecutive two or more pages among a plurality of pages and tab images which correspond to tabs of tab sheets on the operating screen. When a tab image is moved and placed in the first area, which contains at least a sheet image of one page that is displayed on the operating screen, the PC 200 decides the sheet of the page indicated by the sheet image in the first area to be the tab sheet, and when the tab image is moved and placed in the second area, which is different from the first area and contains a midpoint of sheet images of two consecutive pages displayed on the operating screen, it decides to insert the tab sheet between the two consecutive pages.

Therefore, the present embodiment allows the user to specify a particular tab sheet page or tab sheet insertion visually when the user wants to do settings concerning tab sheets. Thus, the user can conduct settings concerning tab sheets more easily and confidently.

Also, in the present embodiment, the PC 200 which functions as a tab sheet setting apparatus displays sheet images which correspond to sheets for two or more pages and tab images each of which corresponds to a tab of a tab sheet and makes the tab position on the tab sheet identifiable on the operating screen. Moreover, if the placement of the tab image is not specified in the layout of a sheet image, the PC 200 decides the tab sheet indicated by the tab image for which placement was not specified in the layout of said sheet images to be a tab sheet which became no longer necessary.

Therefore, the present embodiment enables the user to specify a tab sheet that is not intended to be used on the operating screen visually while the user is doing various settings about tab sheets. Thus, the user can conduct settings concerning tab sheets more easily and confidently.

It is obvious that this invention is not limited to the particular embodiments shown and described above but may be variously changed and modified without departing from the technical concept of this invention.

For example, as mentioned before, the operation for the abovementioned setting of tab sheets can be done not only on the display 204 of the PC 200 that functions as a network terminal but also on the operating panel unit 103 of the MFP 100.

Also, although the embodiments described above shows an MFP as the image forming apparatus, the invention is not limited to it. The present invention is applicable to other image forming apparatuses such as printers, copiers, etc.

The means and method of conducting various processes in the image processing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a memory unit such as a hard disk. Said program can also be provided as independent application software or can be built into the software of the apparatus as a part of its function.

What is claimed is:

1. A tab sheet setting apparatus for specifying a setting concerning a tab sheet comprising:

a display unit for displaying sheet images which correspond to sheets for consecutive two or more pages among a plurality of pages and a tab image which corresponds to a tab of a tab sheet on an operating screen;

a first deciding unit for deciding, in case when said tab image is moved and placed in a first area, which contains at least a sheet image of one page that is displayed on the operating screen, the sheet of the page indicated by the sheet image in the first area to be the tab sheet; and a second deciding unit for deciding, in case when said tab image is moved and placed in a second area, which is different from said first area and contains a midpoint of sheet images of two consecutive pages displayed on said operating screen, to insert the tab sheet between said two consecutive pages.

2. The tab sheet setting apparatus as claimed in claim 1, wherein said tab image is a tab image which corresponds to a tab of a tab sheet and makes the tab position on the tab sheet identifiable on the operating screen;

said first deciding unit decides the sheet of the page indicated by the sheet image in said first area to be the tab sheet on which the tab position indicated by said tab image is specified; and said second deciding unit decides the insertion of the tab sheet, on which the tab position indicated by said tab image is specified, in between said two consecutive pages.

3. The tab sheet setting apparatus as claimed in claim 1, wherein when the sheet of the page indicated by the sheet image in the first area is decided to be the tab sheet by said first deciding unit, said display unit displays a sheet image which corresponds to said tab sheet by correcting the sheet image in the first area to the tab sheet image; and when the insertion of the tab sheet between said two consecutive pages is decided by said second deciding unit, said display unit displays a tab sheet image which corresponds to said tab sheet by placing the tab sheet image in between said two consecutive pages.

4. The tab sheet setting apparatus as claimed in claim 3, wherein the tab image that corresponds to the tab on said tab sheet image, which is displayed on said operating screen by means of specifying the tab sheet page in said first deciding unit and by means of specifying the insertion of the tab sheet in said second deciding unit, can be moved and placed in said first area concerning on another page, or said second area concerning between other pages, or an area where the tab image is placed initially on said operating screen.

5. The tab sheet setting apparatus as claimed in claim 2, further comprising:

a third deciding unit for deciding the tab sheet indicated by the tab image which was not used in specifying the tab sheet page by said first deciding unit or in specifying the insertion of the tab sheet by said second deciding unit to be a tab sheet which became no longer necessary.

6. The tab sheet setting apparatus as claimed in claim 5, wherein said displaying unit further displays a trashcan image on said operating screen, and the tab image that was not used in said specifying process includes a tab image which was moved and placed in a third area including said trashcan image and being different from said first and second areas.

7. The tab sheet setting apparatus as claimed in claim 5, wherein the tab image that was not used in said specifying process include a tab image which remained at the time when the setting concerning a tab sheet is completed in the area where tab images were originally placed on said operating screen.

8. The tab sheet setting apparatus for specifying a setting concerning a tab sheet according to claim 1, wherein:

the display unit displays the sheet images on a layout area of an operating screen, and displays the tab image on an icon area of the operating screen;

the layout area includes a first area which contains at least the sheet image of one page that is displayed, and a second area which is different than the first area and which second area contains a midpoint of sheet images of two consecutive displayed pages;

when said tab image is moved from the icon area to the layout area and then placed in the first area, the sheet of the page indicated by the sheet image in the first area is decided to be the tab sheet; and when said tab image is moved from the icon area to the layout area and then placed in the second area, a tab sheet is inserted between said two consecutive pages.

9. A nontransitory computer readable recording medium stored with a tab sheet setting program for specifying a setting concerning a tab sheet, said tab sheet setting program causing a computer to execute a process comprising:

(a) displaying sheet images which correspond to sheets for consecutive two or more pages among a plurality of pages and a tab image which corresponds to a tab of a tab sheet on an operating screen:

(b) deciding, in case when said tab image is moved and placed in a first area, which contains at least a sheet image of one page that is displayed on the operating screen, the sheet of the page indicated by the sheet image in the first area to be the tab sheet; and (c) deciding, in case when said tab image is moved and placed in a second area, which is different from said first area and contains a midpoint of sheet images of two consecutive pages displayed on said operating screen, to insert the tab sheet between said two consecutive pages.

10. The nontransitory computer readable recording medium as claimed in claim 9, wherein said tab image is a tab image which corresponds to a tab of a tab sheet and makes the tab position on the tab sheet identifiable on the operating screen;

in said step (b), the sheet of the page indicated by the sheet image in said first area is decided to be the tab sheet on which the tab position indicated by said tab image is specified; and in said step (c), the insertion of the tab sheet, on which the tab position indicated by said tab image is specified, in between said two consecutive pages is decided.

11. The nontransitory computer readable recording medium as claimed in claim 9, wherein when the sheet of the page indicated by the sheet image in the first area is decided to be the tab sheet in said step (b), a sheet image which corresponds to said tab sheet is displayed by correcting the sheet image in the first area to the tab sheet image; and when the insertion of the tab sheet between said two consecutive pages is decided in said step (c), a tab sheet image which corresponds to said tab sheet is displayed by placing the tab sheet image in between said two consecutive pages.

12. The nontransitory computer readable recording medium as claimed in claim 11, wherein the tab image that corresponds to the tab on said tab sheet image, which is displayed on said operating screen by means of specifying the tab sheet page in said step (b) and by means of specifying the insertion of the tab sheet in said step (c), can be moved and placed in said first area concerning on another page, or said second area concerning between other pages, or an area where the tab image is placed initially on said operating screen.

13. The nontransitory computer readable recording medium as claimed in claim 10, said process further comprising:

(d) deciding the tab sheet indicated by the tab image which was not used in specifying the tab sheet page in said step (b) or in specifying the insertion of the tab sheet in step (c) to be a tab sheet which became no longer necessary.

14. The nontransitory computer readable recording medium as claimed in claim 13, wherein a trashcan image is further displayed on said operating screen in said step (a);

the tab image that was not used in said specifying process includes a tab image which was moved and placed in a third area including said trashcan image and being different from said first and second areas.

15. The nontransitory computer readable recording medium as claimed in claim 13, wherein the tab image that was not used in said specifying process include a tab image that remained at the time when the setting concerning a tab sheet is completed in the area where tab images were originally placed on said operating screen.

16. The nontransitory computer readable recording medium as claimed in claim 9, wherein:

the sheet images are displayed on a layout area of an operating screen, and the tab image is displayed on an icon area of the operating screen;

the layout area includes a first area which contains at least the sheet image of one page that is displayed, and a second area which is different than the first area and which second area contains a midpoint of sheet images of two consecutive displayed pages;

when said tab image is moved from the icon area to the layout area and then placed in the first area, the sheet of the page indicated by the sheet image in the first area is decided to be the tab sheet; and when said tab image is moved from the icon area to the layout area and then placed in the second area, a tab sheet is inserted between said two consecutive pages.

* * * * *